United States Patent [19]

Nakashima et al.

[11] Patent Number: 5,398,240
[45] Date of Patent: Mar. 14, 1995

[54] MULTIPLEX TRANSMISSION APPARATUS AND MULTIPLEX TRANSMISSION METHOD

[75] Inventors: Takashi Nakashima, Hiroshima; Yoshikazu Nobutoki, Higashihiroshima; Osamu Michihira; Toshimichi Tokunaga, both of Hiroshima, all of Japan

[73] Assignee: Mazda Motor Corporation, Hiroshima, Japan

[21] Appl. No.: 996,592

[22] Filed: Dec. 24, 1992

[30] Foreign Application Priority Data

Dec. 26, 1991 [JP] Japan .................................. 3-343773

[51] Int. Cl.6 ............................................ H04L 12/40
[52] U.S. Cl. .................................................. 370/85.1
[58] Field of Search ....................... 340/825.01, 825.02, 340/825.03, 825.04, 825.05, 825.06, 825.07, 825.08, 825.09, 825.10–.19, 825.20–.29, 825.30–.34; 370/85.1, 91, 16, 16.1, 110.1, 85.2, 110.1, 85.7, 85.8, 16; 364/424.05, 424.01

[56] References Cited

U.S. PATENT DOCUMENTS

| | | | |
|---|---|---|---|
| 4,584,677 | 4/1986 | Kosaka | 370/85.12 |
| 4,887,075 | 12/1989 | Hirasawa | 370/85.1 |
| 4,975,904 | 12/1990 | Mann et al. | 370/85.1 |
| 4,993,025 | 2/1991 | Vesel et al. | 370/85.12 |
| 5,090,012 | 2/1992 | Kajiyama et al. | 370/110.1 |
| 5,111,452 | 5/1992 | Kyuma | 370/85.1 |
| 5,144,621 | 9/1992 | Kinashi et al. | 370/85.1 |

FOREIGN PATENT DOCUMENTS

0433520A1 6/1991 European Pat. Off. .
63-142933 6/1988 Japan .

OTHER PUBLICATIONS

European Search Report dated Mar. 22, 1994.
Mini Micro Conference Record, Nov. 1983, New York, pp. 1–18, V. Coleman et al, "The Implementation of Ethernet/IEEE 802.3 In VLSI".
Electro Conference Record, vol. 6, Apr. 1981, New York, pp. 1–10, D. Folkes, "Serial Network Simplifies The Design Of Multiple Microcomputer Systems".

Primary Examiner—Douglas W. Olms
Assistant Examiner—Huy D. Vu
Attorney, Agent, or Firm—Staas & Halsey

[57] ABSTRACT

In a multiplex transmission apparatus and a multiplex transmission method when a control unit reads reception data while a status flag is set, it determines that the reception data is obtained before data in a transmission buffer is transmitted. When the control unit reads the reception data while the status flag is reset, it determines that the read data is response data to transmission data. Thus, the control unit precisely recognizes the time series of data on communication control.

7 Claims, 4 Drawing Sheets

MULTIPLEX TRANSMISSION APPARATUS AND MULTIPLEX TRANSMISSION METHOD

BACKGROUND OF THE INVENTION

The present invention relates to a multiplex transmission apparatus and a multiplex transmission method used when a controller performs data transmission/reception via a communication unit having a transmission buffer through a multiplex transmission path.

In recent years, in the field of automobiles, since the number of electrical components such as switches, sensors, actuators, and the like is increased according to the advance in "car electronics", an enlarged, complicated wiring harness structure for connecting these electrical components poses a serious problem. In order to solve this problem, as disclosed in Japanese Patent Laid-Open No. 63-142933, a multiplex transmission system which shares a single transmission path by a plurality of electrical components is receiving a lot of attention. When the common transmission path is time-divisionally used, data communications among a plurality of nodes connected to the transmission path is realized.

For example, a control node (4WS node) for performing four-wheel steering control comprises a CPU serving as a controller connected to sensors and actuators, and a multiplex LSI serving as a communication unit for controlling multiplex transmission. In order to realize the four-wheel steering control, the CPU controls the operation of its own actuators according to data from its own sensors, and issues a transmission request to the multiplex LSI, so that data from the sensors can be utilized by another node, e.g., a control node (TRC node) for performing traction control.

The multiplex LSI comprises a transmission buffer, and data corresponding to the transmission request is written in the transmission buffer. Furthermore, the multiplex LSI adds information indicating a transmission source and a transmission destination to the data in the transmission buffer, and transmits the data onto a multiplex transmission path in a predetermined format. In this case, when a plurality of nodes simultaneously execute transmission operations, signal collision occurs on the multiplex transmission path. In order to prevent this collision, a priority order is given to the nodes. That is, a node having a low priority must execute transmission after the transmission of a node having a high priority is completed.

The multiplex LSI of the 4WS node also comprises a reception buffer. That is, required data is extracted from a signal on the multiplex transmission path, which signal is transmitted from another node to the 4WS node, and the extracted data is written in the reception buffer as reception data. The CPU of the 4WS node reads the data in the reception buffer, and reflects the read data in the four-wheel steering control.

On the other hand, the TRC node also comprises a CPU and a multiplex LSI, which are the same as those in the 4WS node. That is, the TRC node reflects data transmitted from other nodes in its own traction control, and has a function of transmitting data to other nodes. Conventionally, cooperation control between, e.g., the 4WS and TRC nodes is realized, as described above.

However, according to the conventional multiplex transmission method, the CPU of, e.g., the 4WS node has no means for checking if data written in the transmission buffer is actually transmitted onto the multiplex transmission path. For this reason, when the CPU of the 4WS node reads reception data from the TRC node while the 4WS node is set in a transmission standby state, the cooperation control with the TRC node is interfered with.

More specifically, although data written in the transmission buffer and addressed to the TRC node is not transmitted yet in practice, the CPU of the 4WS node erroneously determines that the read reception data is a response to its own transmission data, and reflects the read data in the four-wheel steering control. On the other hand, since the CPU of the TRC node has not actually received transmission data from the 4WS node, it has not transmitted response data to the transmission data of the 4WS node yet. That is, control inconsistency occurs between the 4WS and TRC nodes, and preferable cooperation control between these nodes cannot be realized.

SUMMARY OF THE INVENTION

It is an object of the present invention to provide a multiplex transmission apparatus and a multiplex transmission method, which can precisely recognize the time series of data on communication control in multiplex transmission.

In order to achieve the above object, according to the present invention, there is provided a multiplex transmission apparatus in which a plurality of control units separately connected to a common multiplex transmission path perform transmission/reception of information with each other, comprising: transmission data storage means for storing transmission data to be transmitted from each of the control units onto the multiplex transmission path; reception data storage means for storing reception data received from the multiplex transmission path by each of the control units; means for, when the transmission data is written in the transmission data storage means, setting a predetermined flag; and means for, when the transmission data is transmitted from the transmission data storage means onto the multiplex transmission path, resetting the predetermined flag, wherein each of the control units reads the flag together with the reception data stored in the reception data storage means.

According to the present invention, there is also provided a multiplex transmission method in which a plurality of control units separately connected to a common multiplex transmission path perform transmission/reception of information with each other via a buffer provided to each of the control units, comprising: the step of storing transmission data to be transmitted from each of the control units onto the multiplex transmission path in the buffer; the step of setting a predetermined flag when the transmission data is written in the buffer; the step of resetting the predetermined flag when the transmission data is transmitted from the buffer onto the multiplex transmission path; the step of storing reception data received from the multiplex transmission path by each of the control units; and the step of reading the flag together with the reception data by each of the control units.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
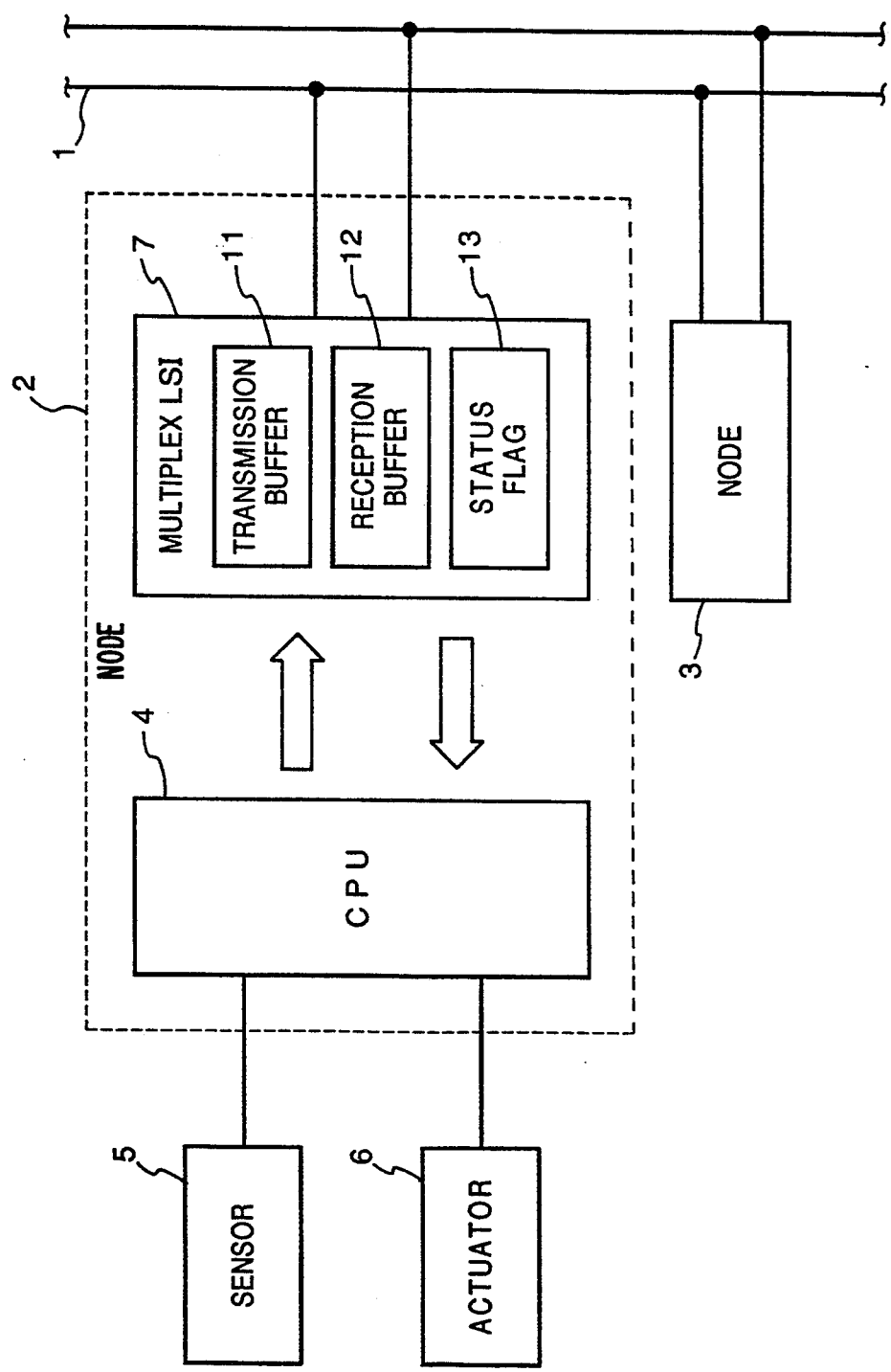
FIG. 1 is a block diagram showing an arrangement of a main part of a multiplex transmission apparatus according to the present invention.

FIG. 1 is a block diagram showing an arrangement of a main part of a multiplex transmission apparatus according to the present invention. As shown in FIG. 1, a control node 2 and another node 3 are connected to a multiplex transmission path 1. The following description will be made under an assumption that the control node 2 corresponds to a 4WS node, and the other node 3 corresponds to a TRC node.

The control node 2 comprises a CPU 4 serving as a controller for realizing four-wheel steering control. The CPU 4 is connected to a sensor 5 and an actuator 6. The control node 2 also comprises a multiplex LSI 7 serving as a communication unit for controlling multiplex transmission. The multiplex LSI 7 has a transmission buffer 11, a reception buffer 12, and a 1-bit status flag 13 for identifying a transmission state of data in the transmission buffer 11.

Figure 2:
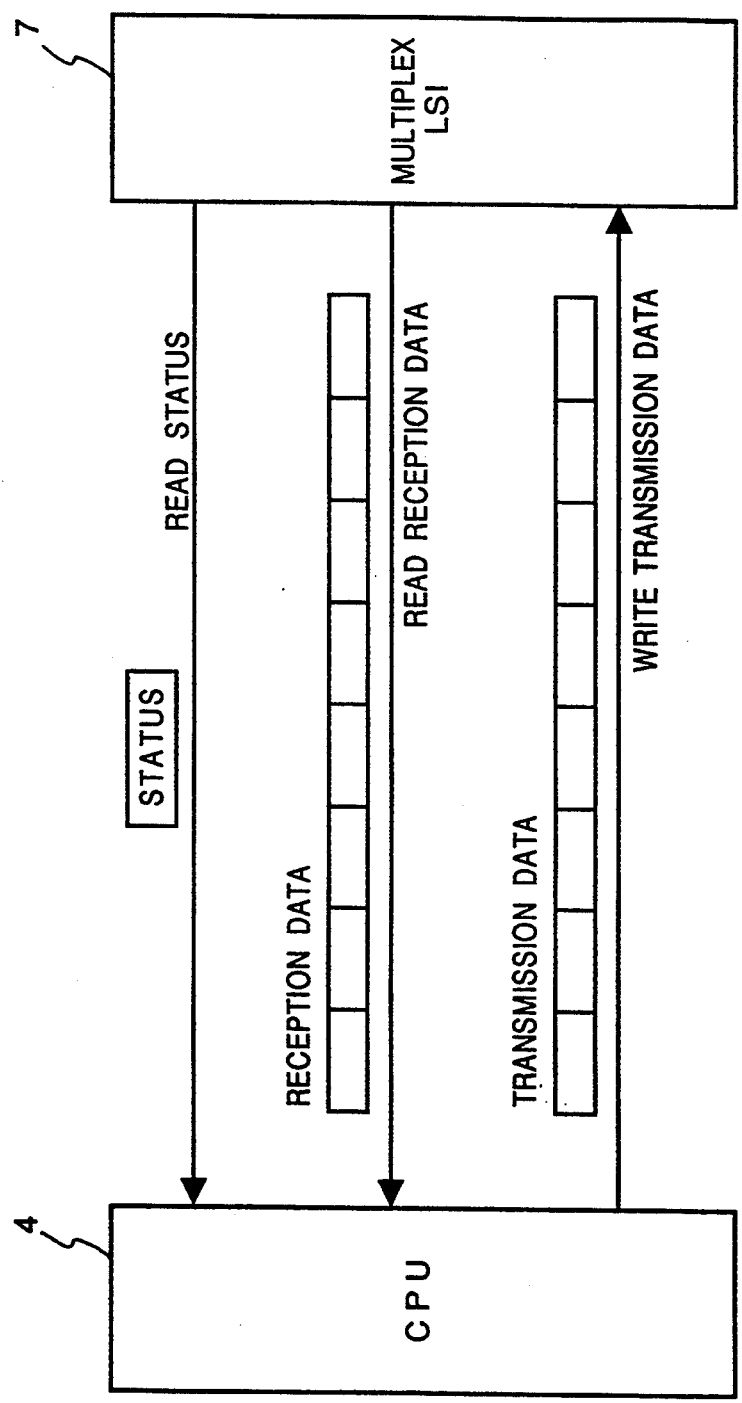
FIG. 2 is a schematic view showing data transmission/reception in the apparatus according to the embodiment shown in FIG. 1.

FIG. 2 is a schematic view illustrating a data transmission/reception method between the CPU 4 and the multiplex LSI 7 in the control node 2. The operation of the control node 2 will be described below with reference to FIGS. 1 and 2.

In order to realize the four-wheel steering control, the CPU 4 controls the operation of the actuator 6 according to data from the sensor 5, and issues a transmission request to the multiplex LSI 7 to transmit data from the sensor 5 to another node. More specifically, transmission data is written in the transmission buffer 11 of the multiplex LSI 7 by the CPU 4. The multiplex LSI 7 waits for its transmission timing, and adds information indicating a transmission source and a transmission destination to the data in the transmission buffer 11 so as to convert the data into data having a predetermined format. The LSI 7 then transmits the data onto the multiplex transmission path 1. The transmitted data is received by a node designated as the transmission destination.

When the other node 3 transmits data addressed to the control node 2 onto the multiplex transmission path 1, the control node 2 extracts required data from the transmission data on the multiplex transmission path 1, and the extracted data is written in the reception buffer 12 of the multiplex LSI 7 as reception data. The data in the reception buffer 12 is read by the CPU 4 together with the status flag 13, and is reflected in the four-wheel steering control by the CPU 4.

A data transmission/reception control sequence in the multiplex transmission apparatus according to this embodiment will be described below with reference to the flow chart shown in FIG. 3.

Figure 3:
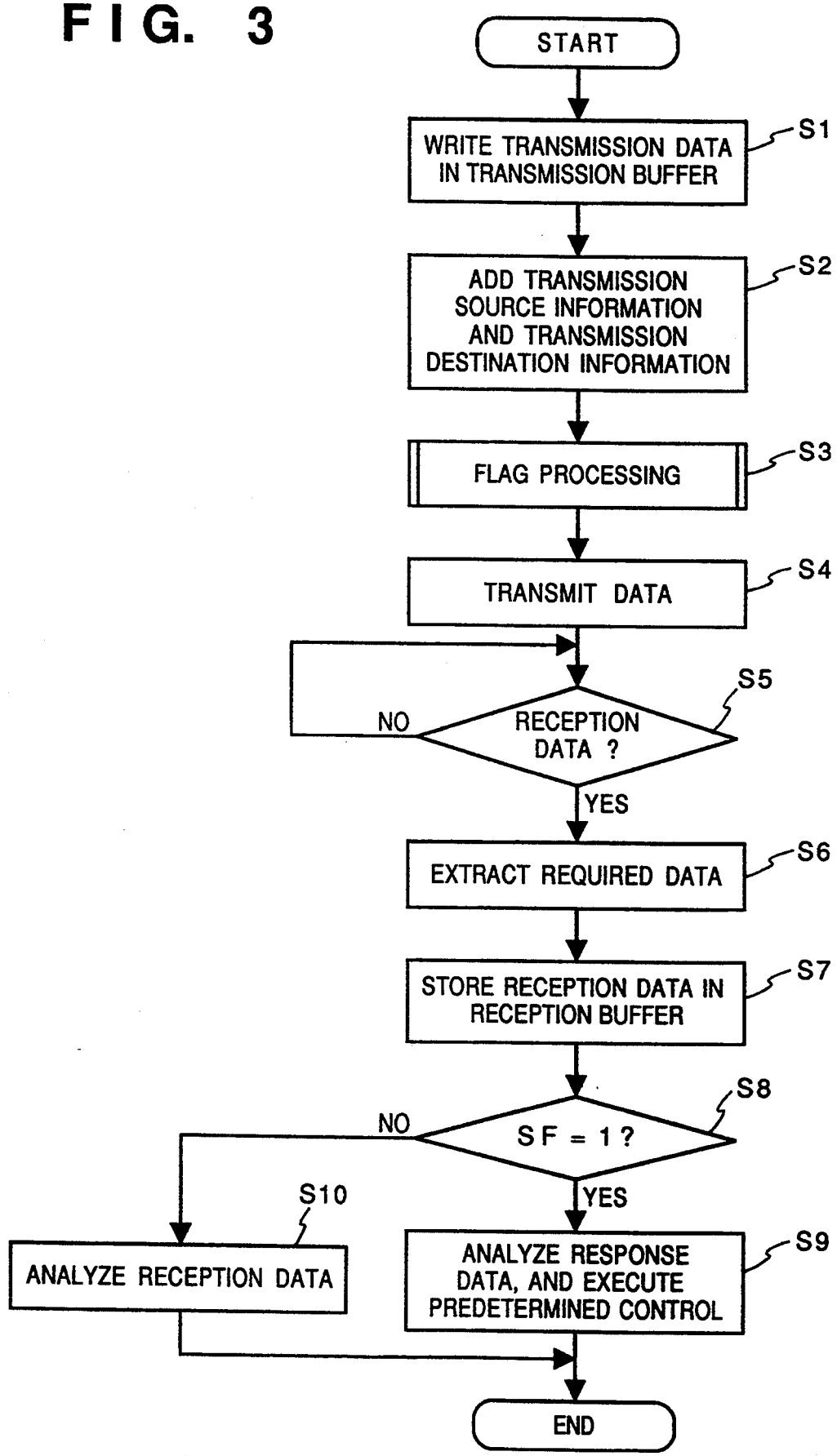
FIG. 3 is a flow chart showing a data transmission/reception control sequence in the apparatus according to the embodiment shown in FIG. 1.

In step S1 in FIG. 3, the CPU 4 writes transmission data in the transmission buffer 11. In step S2, the CPU 4 adds transmission source information and transmission destination information to the data in the transmission buffer 11. In step S3, the CPU 4 executes flag processing to be described later.

In step S4, the CPU 4 transmits the data stored in the transmission buffer 11 onto the multiplex transmission path 1. In step S5, the CPU 4 checks if there is data addressed to the control node 2, i.e., reception data. If YES in step S5, the CPU 4 extracts required data from data on the multiplex transmission path 1 in step, S6, and stores the extracted data in the reception buffer 12 in step S7.

In step S8, the CPU 4 checks if a status flag (SF; to be described later) is "1". If YES in step S8, the CPU 4 determines that the control node 2 received response data to the data transmitted in step S4, and executes analysis of response data and predetermined control corresponding to the data, i.e., four-wheel steering control in this case, in step S9.

However, if it is determined in step S8 that the flag is "0", the CPU 4 determines that the reception data is not response data to the transmission data, and analyzes the data in step S10.

The status flag 13 read by the CPU 4 together with the reception data is set or reset as follows.

Figure 4:
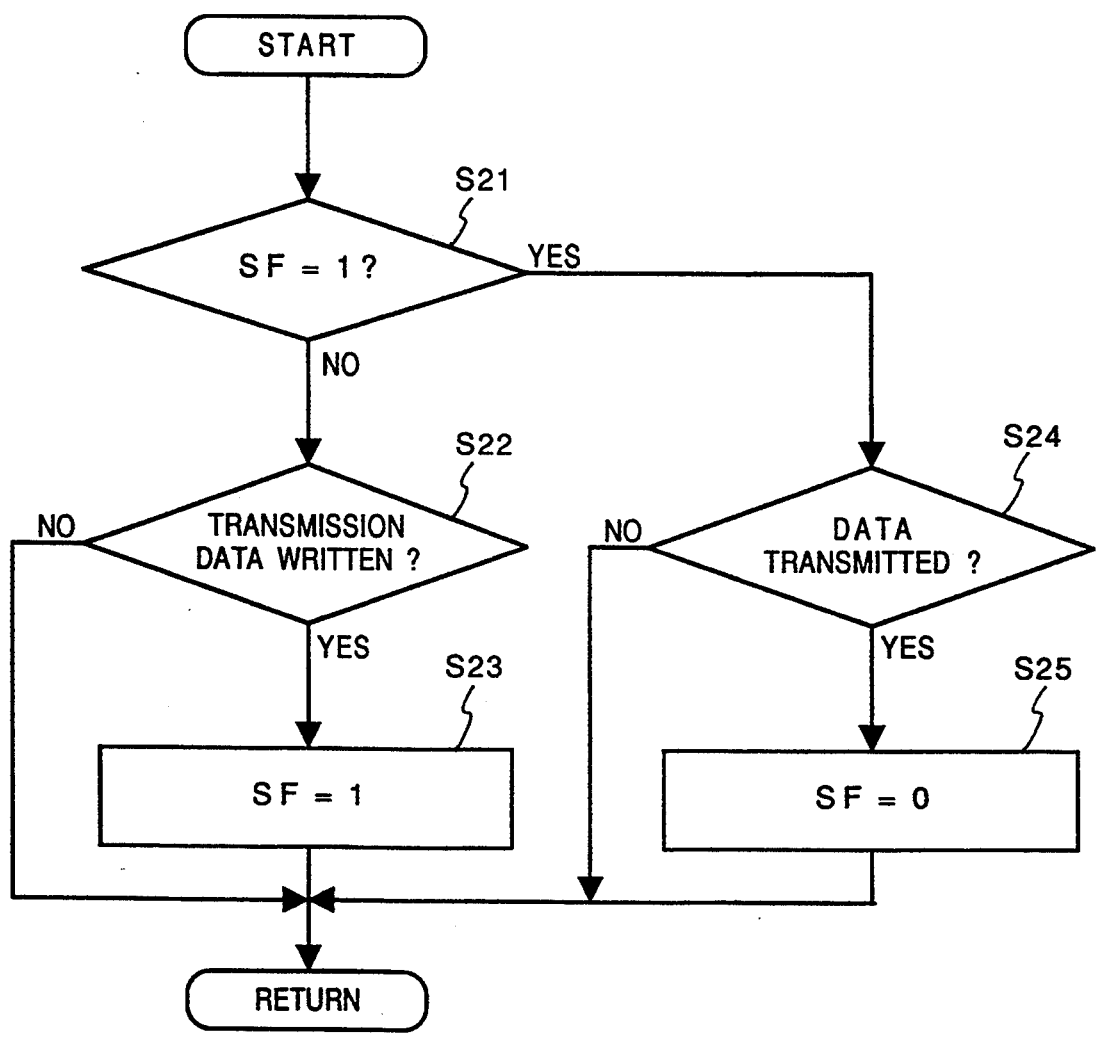
FIG. 4 is a flow chart showing processing associated with flags in the embodiment shown in FIG. 1.

FIG. 4 is a flow chart showing a method of processing the status flag (SF) in the multiplex LSI 7.

In step S21, the CPU 4 checks if the status flag 13 is set to be "1". If NO in step S21, the CPU 4 sets the status flag to be "1" when it writes transmission data in the transmission buffer 11 (steps S22 and S23). However, if YES in step S21, the status flag 13 is reset to "0" only when data in the transmission buffer 11 is transmitted onto the multiplex transmission path 1 (steps S24 and S25).

In this manner, only when non-transmitted data remains in the transmission buffer 11, the status flag 13 is kept set to be "1". For this reason, when the CPU 4 reads the status flag 13, which is set to be "1", and obtains reception data, it is determined that the reception data is obtained before the data in the transmission buffer 11 is transmitted. When the CPU 4 reads the status flag 13, which is reset to "0", it is determined that the reception data is obtained after the data in the transmission buffer 11 is transmitted. In this manner, the CPU 4 can precisely recognize the time series of data on communication control with reference to the status flag 13.

More specifically, the CPU 4 can check if data written in the transmission buffer 11 of the multiplex LSI 7 is actually transmitted onto the multiplex transmission path 1. For this reason, when the CPU 4 reads reception data from the other node 3 while the control node 2 is set in a transmission standby state due to its priority, reflection of the reception data in the four-wheel steering control can be withheld.

The control node 2 can wait until the other node 3 actually transmits response data to the transmission data from the control node 2, and thereafter, can reflect reception data from the other node 3 in the four-wheel steering control. More specifically, no control inconsistency occurs between the control node (4WS node) 2 and the other node (TRC node) 3, and preferred cooperation control between these nodes can be assured.

Note that the present invention is not limited to cooperation control between the 4WS and TRC nodes, but may be suitably applied to another cooperation control between, e.g., a control node (EGI node) for realizing engine control and a control node (EAT node) for realizing automatic transmission control.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission apparatus in which a plurality of control units separately connected to a common multiplex transmission path perform transmission/reception of information with each other, comprising:

transmission data storage means for storing transmission data to be transmitted from each of said control units onto said multiplex transmission path;

reception data storage means for storing reception data transmitted by each of said control units via said multiplex transmission path;

means for setting a flag for indicating a state that the transmission data is being stored in said transmission data storage means and waiting to be transmitted; and means for resetting the flag for indicating a state that the transmission data has been transmitted from said transmission data storage means onto said multiplex transmission path;

wherein each of said control units reads out the flag together with the reception data stored in said reception data storage means and determines that the reception data is not response data to the transmission data when said reception data storage means stores the reception data while the flag is set, or determines that the reception data is response data to the transmission data when said reception data storage means stores the reception data while the flag is reset.

2. The apparatus according to claim 1, wherein a plurality of said flags are provided, and said flags respectively correspond to said plurality of control units.

3. The apparatus according to claim 1, wherein when the flag is set, said reception data storage means does not store reception data.

4. The apparatus according to claim 1, wherein each of said control units is connected to a sensor for inputting a predetermined signal to the corresponding control unit, and to an actuator controlled by the corresponding control unit.

5. A multiplex transmission method in which a plurality of control units separately connected to a common multiplex transmission path perform transmission/reception of information with each other via transmission buffer or reception buffer provided to each of said control units, comprising the steps of:

storing transmission data to be transmitted from each of said control units onto said multiplex transmission path in said transmission buffer;

setting a flag when the transmission data is written in said transmission buffer;

resetting the flag when the transmission data is transmitted from said transmission buffer onto said multiplex transmission path;

storing reception data transmitted by each of said control units via said multiplex transmission path; and reading out the flag together with the reception data by each of said control units, wherein each of said control units determines that the reception data is not response data to the transmission data when said reception buffer stores the reception data while the flag is set, or determines that the reception data is response data to the transmission data when said reception buffer stores the reception data while the flag is reset.

6. The method according to claim 5, wherein a plurality of said flags are provided, and said flags respectively correspond to said plurality of control units.

7. The method according to claim 5, wherein when the flag is set, said reception buffer does not store reception data.

* * * * *